(12) United States Patent
Yap et al.

(10) Patent No.: US 10,691,458 B2
(45) Date of Patent: *Jun. 23, 2020

(54) METHOD AND APPARATUS TO PROCESS KECCAK SECURE HASHING ALGORITHM

(71) Applicant: Intel Corporation, Santa Clara, CA (US)

(72) Inventors: Kirk S. Yap, Framingham, MA (US); Gilbert Wolrich, Framingham, MA (US); James D. Guilford, Northborough, MA (US); Vinodh Gopal, Westborough, MA (US); Erdinc Ozturk, Marlborough, MA (US); Sean M. Gulley, Boston, MA (US); Wajdi K. Feghali, Boston, MA (US); Martin G. Dixon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/716,258

(22) Filed: Sep. 26, 2017

(65) Prior Publication Data

US 2018/0157489 A1    Jun. 7, 2018

Related U.S. Application Data

(63) Continuation of application No. 13/976,184, filed as application No. PCT/US2011/064640 on Dec. 13, 2011, now Pat. No. 9,772,845.

(51) Int. Cl.
*G06F 9/30* (2018.01)
*H04L 9/06* (2006.01)

(52) U.S. Cl.
CPC ........ *G06F 9/30145* (2013.01); *H04L 9/0643* (2013.01); *H04L 2209/122* (2013.01)

(58) Field of Classification Search
None
See application file for complete search history.

(56) References Cited

U.S. PATENT DOCUMENTS

| 8,924,741 B2 | 12/2014 | Wolrich et al. |
| 2008/0279369 A1 | 11/2008 | Palmer |
| 2009/0262925 A1 | 10/2009 | Vijayarangan |

(Continued)

FOREIGN PATENT DOCUMENTS

| CN | 101872338 A | 10/2010 |
| TW | 201135460 A | 10/2011 |

OTHER PUBLICATIONS

Bertoni G., et al., "KECCAK specifications," http://keccak.noekeon.org/, Oct. 27, 2008, 5 pages.

(Continued)

*Primary Examiner* — Corey S Faherty
(74) *Attorney, Agent, or Firm* — Nicholson De Vos Webster & Elliott LLP

(57) ABSTRACT

A processor includes a plurality of registers, an instruction decoder to receive an instruction to process a KECCAK state cube of data representing a KECCAK state of a KECCAK hash algorithm, to partition the KECCAK state cube into a plurality of subcubes, and to store the subcubes in the plurality of registers, respectively, and an execution unit coupled to the instruction decoder to perform the KECCAK hash algorithm on the plurality of subcubes respectively stored in the plurality of registers in a vector manner.

12 Claims, 11 Drawing Sheets

(56) References Cited

U.S. PATENT DOCUMENTS

| | | |
|---|---|---|
| 2011/0040977 A1 | 2/2011 | Farrugia et al. |
| 2011/0138192 A1 | 6/2011 | Kocher et al. |
| 2011/0283110 A1 | 11/2011 | Dapkus et al. |
| 2012/0076298 A1 | 3/2012 | Bolotov et al. |
| 2013/0227209 A1 | 8/2013 | Czerkowicz et al. |
| 2014/0122898 A1 | 5/2014 | Yamada |

OTHER PUBLICATIONS

Hoerder S., et al., "An Evaluation of Hash Functions on a Power Analysis Resistant Processor Architecture," WISTP 2011, IFIP 2011, LNCS 6633, 15 pages.

Intel Corporation, "Intel 64 and IA-32 Architectures Software Developer's Manual," Instruction Set Reference A-Z, vol. 2 (2A 28 & 2C), Jun. 2014, 1493 pages.

International Preliminary Report on Patentability for Application No. PCT/US2011/064640, dated Jun. 26, 2014, 7 pages.

International Search Report for Application No. PCT/US2011/064640, dated Jul. 27, 2012, 9 pages.

Notice of Allowance from foreign counterpart Chinese Patent Application No. 201180074906.2, dated May 12, 2016, 4 pages.

Notice of Allowance from foreign counterpart Taiwan Application No. 101143667, dated Feb. 26, 2015 3 pages.

Notice of Allowance from foreign counterpart Taiwan Patent Application No. 104110462, dated Jun. 8, 2016, 3 pages.

Notice of Allowance from U.S. Appl. No. 13/976,184, dated May 6, 2016, 12 pages.

Notice of Allowance from U.S. Appl. No. 13/976,184, dated May 25, 2017, 11 pages.

Office action and Search Report from foreign counterpart Chinese Patent Application No. 201180074906.2, dated Aug. 31, 2015, 16 pages.

Office action and Search Report from foreign counterpart Taiwan Patent Application No. 104110462, dated Nov. 23, 2015, 9 pages.

Office Action from foreign counterpart Taiwanese Patent Application No. 101143667, dated Sep. 1, 2014, 4 pages.

$\theta: a[x][y][z] \leftarrow a[x][y][z] + \sum_{y'=0}^{4} a[x-1][y'][z] + \sum_{y'=0}^{4} a[x+1][y'][z-1],$ $\rho: a[x][y][z] \leftarrow a[x][y][z-(t+1)(t+2)/2],$ with $t$ satisfying $0 \leq t < 24$ and $\begin{pmatrix} 0 & 1 \\ 2 & 3 \end{pmatrix}^t \begin{pmatrix} 1 \\ 0 \end{pmatrix} = \begin{pmatrix} x \\ y \end{pmatrix}$ in $GF(5)^{3 \times 2}$, or $t = -1$ if $x = y = 0$, $\pi: a[x][y] \leftarrow a[x'][y'],$ with $\begin{pmatrix} x \\ y \end{pmatrix} = \begin{pmatrix} 0 & 1 \\ 2 & 3 \end{pmatrix} \begin{pmatrix} x' \\ y' \end{pmatrix},$ $\chi: a[x] \leftarrow a[x] + (a[x+1]+1)a[x+2],$ $\iota: a \leftarrow a + RC[i_r].$

501 Initialization: Save a copy of the unprocessed State

Mov ZMMTMP1, ZMM1

Mov ZMMTMP2, ZMM2

Mov ZMMTMP3, ZMM3

Mov ZMMTMP4, ZMM4

502 KECCAK_THETA: Perform $\theta$ function and 1st part of $\rho$ rotate function.

Keccak_Theta ZMM1, ZMM2, ZMM3

Keccak_Theta ZMM2, ZMM3, ZMM4

Keccak_Theta ZMM3, ZMM1, ZMMTMP1

Keccak_Theta ZMM4, ZMMTMP1, ZMMTMP2

503 KECCAK_ROUND: Complete $\rho$ rotate function and perform $\pi, \chi, \iota$ Functions Keccak_Rnd ZMM1, ZMMTMP4, ZMMRC Keccak_Rnd ZMM2, ZMMTMP1, ZMMRC Keccak_Rnd ZMM3, ZMMTMP2, ZMMRC Keccak_Rnd ZMM4, ZMMTMP3, ZMMRC

METHOD AND APPARATUS TO PROCESS KECCAK SECURE HASHING ALGORITHM

FIELD OF THE INVENTION

Embodiments of the present invention relate generally to instruction processing apparatuses. More particularly, embodiments of the invention relate to instruction processing apparatus to process KECCAK secure hashing algorithms.

BACKGROUND

KECCAK is a new secure hashing function that maintains state in an array of bits arranged with a 5×5 edge surface and depth of $2^L$ where L=0 to 6. KECCAK is under consideration by the National Institute of Standards and Technology (NIST) as an algorithm for selection as the SHA-3 standard. The performance of KECCAK in hardware implementations exceeds that of other secure hash algorithms competing for the standard due to the simple logic functions required and the parallelism that can be utilized. The performance of KECCAK for current software implementations is constrained by the high number of logic operations that require individual integer instructions.

A KECCAK state can be viewed as a three dimensional array of elements (bits) with a 5×5 element edge termed a "slice" and a depth (z direction) of w bits where the depth is a power of 2, i.e. $w=2^l$ for l=0 to 6, as shown in FIG. 1A. KECCAK uses a "sponge" construction where r bits are input to the KECCAK state with an XOR of the "first" r bits of state, followed by the KECCAK-f state update function. KECCAK-1600 (l=64) is the target function providing the highest capacity for message authentication. Mapping the lanes of the state, i.e., the one-dimensional sub-arrays in the direction of the z axis, onto 64 bit processor words, results in simple and efficient software implementation for the step mappings. For l=6, KECCAK-1600 (5×5×64) is the state update function consisting of $n_r$ rounds of five steps/permutations, $\theta, \rho, \pi, \chi, \iota$ as shown in FIG. 1B.

The $\theta$ function is performed as illustrated in FIG. 1C and the $\rho$ function rotates the lanes/registers by specified offsets, requiring 24 register rotates (one offset is zero) as shown in FIG. 1D. The $\pi$ function is a transposition of the lanes. This transposition changes the usage and grouping of every 64 bit section as shown in FIG. 1E. The transpose has a period of 24 rounds before lanes return to their original position. During the $\chi$ step, each row is transformed by neighboring elements of that row:

$$A[x,y]=a[x,y]\oplus((NOT\ a[x+1,y])\ AND\ a[x+2,y])$$

A row of lanes are calculated together, with 5 NOTs, 5 ANDs, and 5 XORs needed for a total of 15×5=75 operations. The $\iota$ add round constant is applied to a single register/lane requiring 1 XOR instruction as shown in FIG. 1F. The operations per round are 55 for $\theta$, 24 for $\rho$, zero for $\pi$, 75 for $\chi$, 1 for $\iota$. There are a total of 155 operations per round. The number of rounds $n_r$ is 12+2l=24 for l=6, i.e. 64 bit registers. For 24 rounds KECCAK requires 155*24=3720 operations. On a four execution unit processor if each operation requires an instruction, a minimum of 930 cycles are required.

The above operations cannot be performed efficiently using parallel execution of the functions using vector instructions, such as streaming single instruction multiple data (SIMD) extensions (SSE) or advanced vector extensions (AVX) instructions from Intel® Corporation of Santa Clara, Calif., due to the $\pi$ function since the location of the lanes and corresponding words of the cube are scrambled each round.

BRIEF DESCRIPTION OF THE DRAWINGS

Embodiments of the invention are illustrated by way of example and not limitation in the figures of the accompanying drawings in which like references indicate similar elements.

FIGS. 1A-1F are diagrams illustrating a process of a typical KECCAK hash algorithm.

FIG. 5 is pseudocode to perform KECCAK hash algorithm according to one embodiment.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1A:
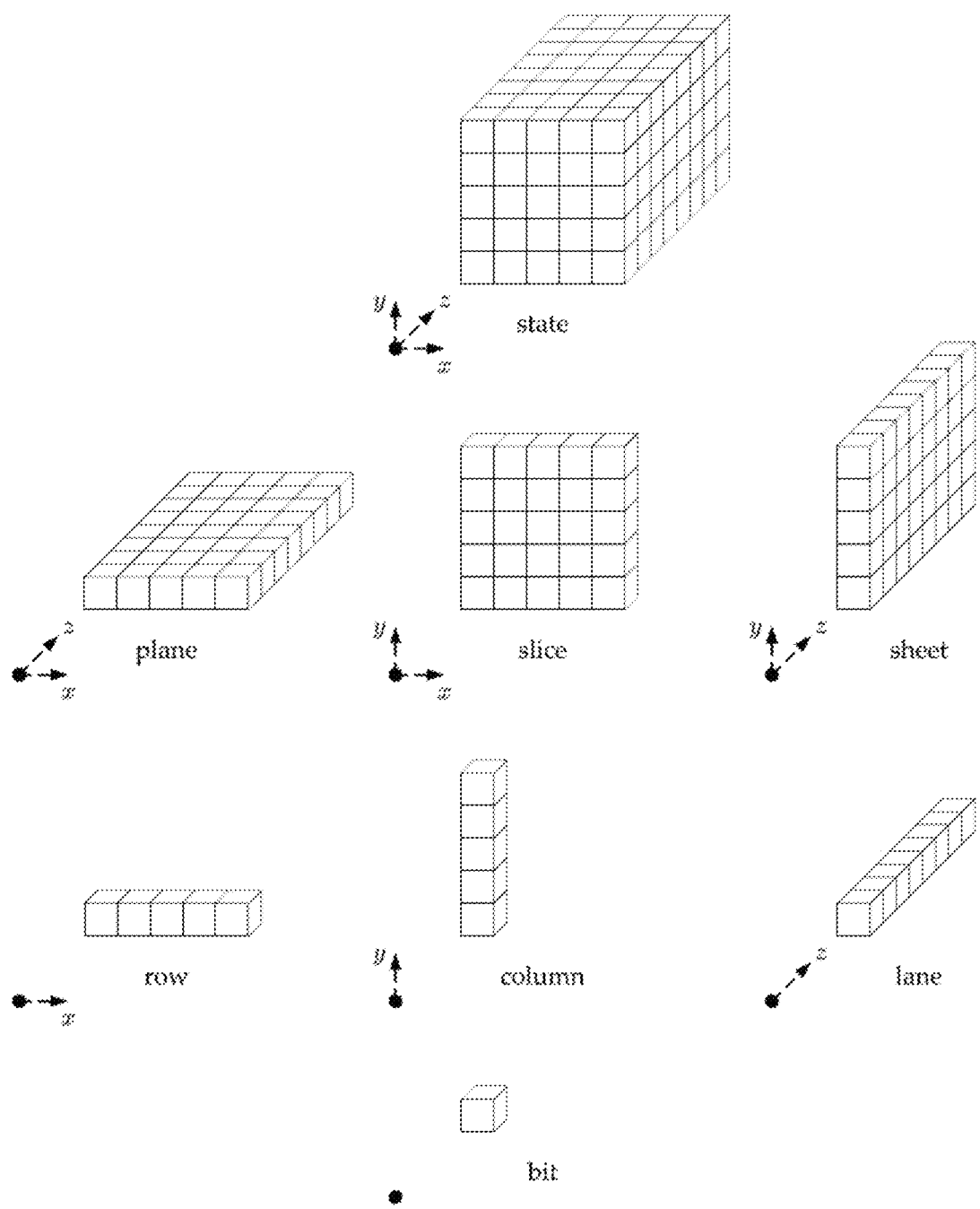
Figure 1D:
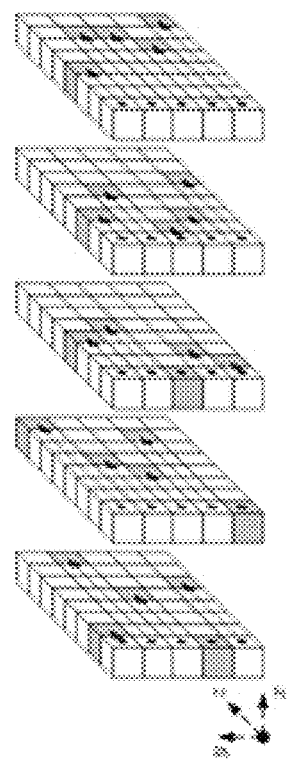
Figure 1C:
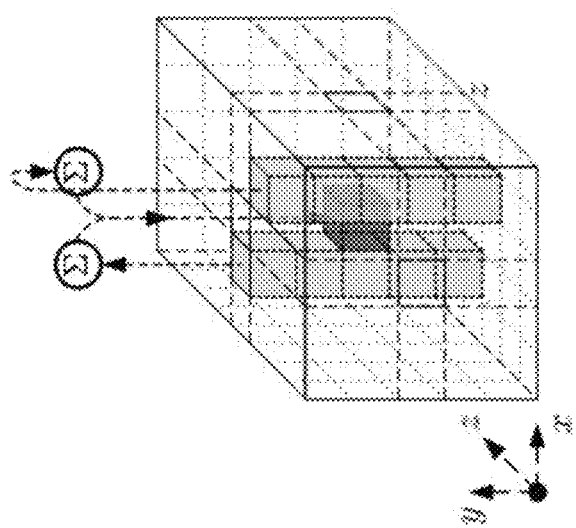
Figure 1F:
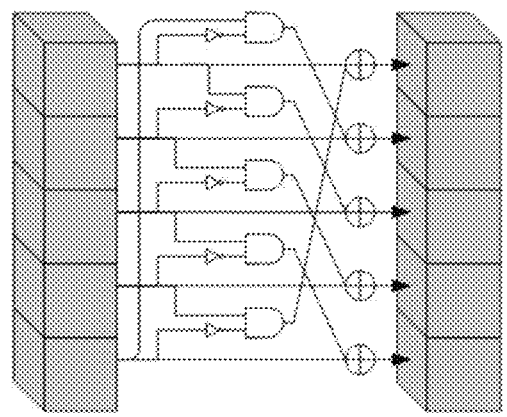
Figure 1E:
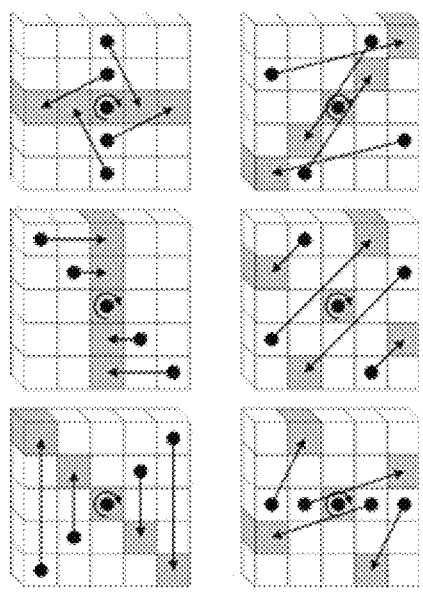

According to some embodiments, a vector instruction and a data path are utilized to reduce instructions of the KECCAK function from more than one hundred instructions per round to approximately eight instructions per KECCAK round. In one embodiment, in response to an instruction to perform KECCAK operations received at a processor, several registers having at least 450 bits are utilized to store data representing a KECCAK state cube as shown in FIG. 1A. As described above, a KECCAK state cube (e.g., 64 slices) requires 1600 storage bits. In one embodiment, the KECCAK state cube is partitioned into at least four subcubes, where each subcube represents at least 16 slices or a ¼ state cube. The four subcubes are stored in at least four registers that have at least 450 bits, such as ZMM compatible registers (e.g., 512-bit wide registers) available from Intel processors, where each register stores a 5×5×16 or 400 bit portion of the KECCAK state cube (e.g., ¼ state cube). The 400 bits stored in each register are partitioned as 25 16-bit sections, where each 16-bit section represents ¼ of a lane of the full KECCAK state cube. The rest of 50 bits may be utilized to store intermediate results (e.g., additional two slices) during the operations as set forth below. Thereafter, at least some of the KECCAK functions set forth above can be performed by a vector capable processor in a vector manner or parallel.

Figure 2:
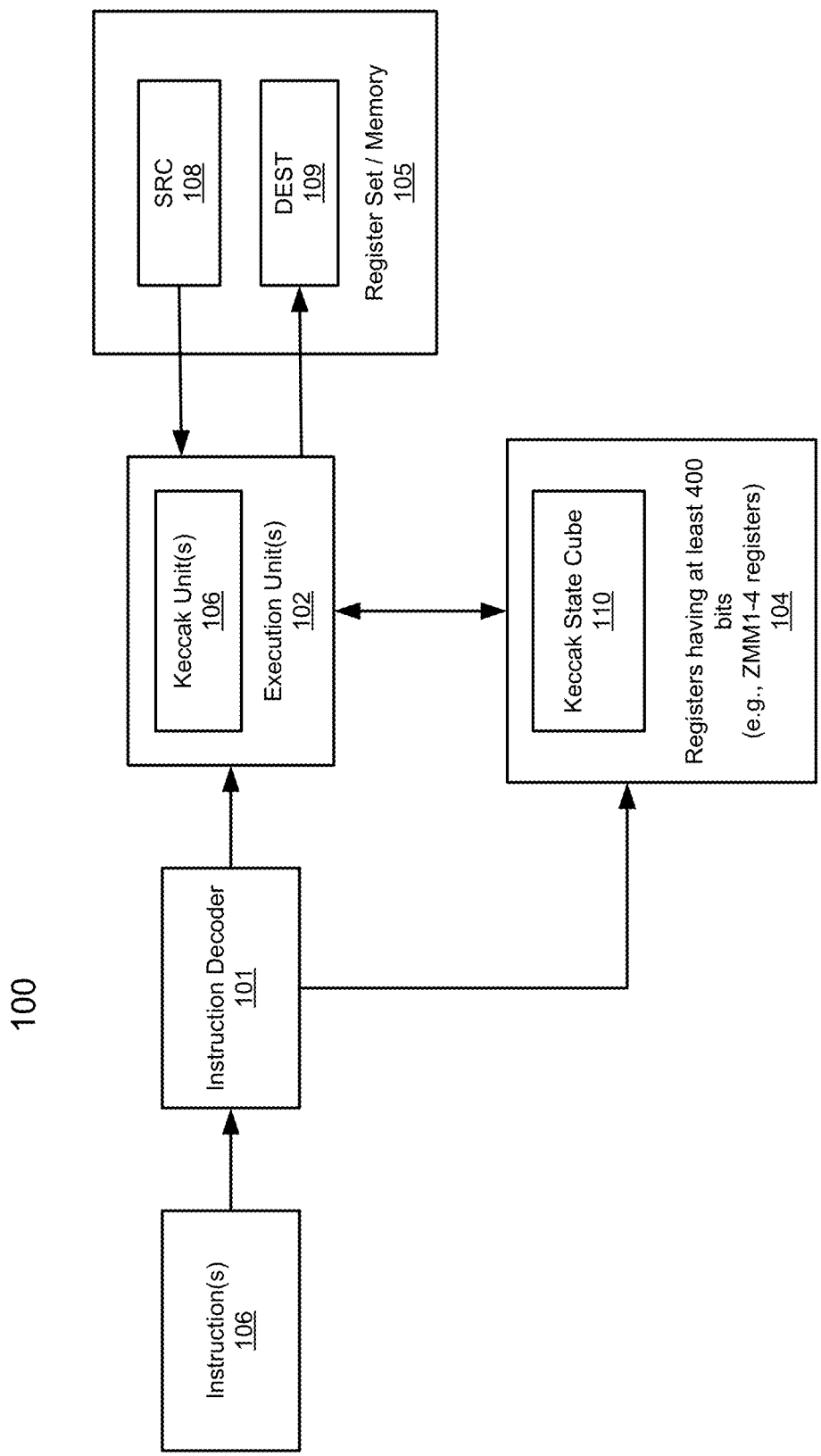
FIG. 2 is a block diagram illustrating an example of a processor according one embodiment.

FIG. 2 is a block diagram illustrating an example of a processor according one embodiment. Referring to FIG. 2, processor 100 may represent any kind of instruction processing apparatuses. For example, processor 101 may be a general-purpose processor. Processor 100 may be any of various complex instruction set computing (CISC) processors, various reduced instruction set computing (RISC) processors, various very long instruction word (VLIW) processors, various hybrids thereof, or other types of processors entirely. In one embodiment, processor 100 includes instruction decoder 101 to receive and decode instruction 106. Instruction decoder 101 may generate and output one or more micro-operations, micro-code, entry points, microinstructions, other instructions, or other control signals, which reflect, or are derived from, instruction 106. Instruction decoder 101 may be implemented using various different mechanisms. Examples of suitable mechanisms include, but are not limited to, microcode read only memories (ROMs), look-up tables, hardware implementations, programmable logic arrays (PLAs), and the like.

Processor 100 further includes one or more execution units 102, which may include an arithmetic logic unit, or another type of logic unit capable of performing operations based on instruction 106. As a result of instruction decoder 101 decoding instruction 106, execution unit 102 may receive one or more micro-operations, micro-code entry points, microinstructions, other instructions, or other control signals, which reflect, or are derived from, instruction 106. Execution unit 102 may be operable as a result of instruction 106 indicating one or more source operands (SRC) 108 and to store a result in one or more destination operands (DEST) 109 of register set 105 indicated by instruction 106. Execution unit 102 may include circuitry or other execution logic (e.g., software combined with hardware and/or firmware) operable to execute instructions or other control signals derived from instruction 106 and perform an operation accordingly. Execution unit 102 may represent any kinds of execution units such as logic units, arithmetic logic units (ALUs), arithmetic units, integer units, etc.

In one embodiment, instruction 106 may implicitly indicate and/or explicitly specify (e.g., through one or more dedicated fields or sets of bits) the source and destination operands. Examples of suitable sources and/or destination of the operands include registers, memory, immediate of the instruction, and combinations thereof. In various embodiments, the source and destination operands may be 8-bit, 16-bit, 32-bit, or 64-bit operands, although this is not required.

In one embodiment, some or all of the source and destination operands may be stored in registers of a register set or memory 105. The register set may be part of a register file, along with potentially other registers, such as status registers, flag registers, etc. A register may be a storage location or device that may be used to store data. The register set may often be physically located on die with the execution unit(s). The registers may be visible from the outside of the processor or from a programmer's perspective. For example, instructions may specify operands stored in the registers. Various different types of registers are suitable, as long as they are capable of storing and providing data as described herein. The registers may or may not be renamed Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

According to one embodiment, a vector instruction and data path for performing KECCAK operations are utilized to reduce instructions of the KECCAK function from more than one hundred instructions per round to approximately eight instructions per KECCAK round. In one embodiment, in response to instruction 106 to perform KECCAK operations received at instruction decoder 101, instruction decoder 101 is configured to arrange registers 104 having at least 400 bits to store data 110 representing a KECCAK state cube and additional at least 50 bits to store intermediate results. Note that the registers 104 may be part of register set 105 (e.g., source and/or destination registers) and KECCAK state cube 110 may be retrieved from the memory. As described above, a KECCAK state cube (e.g., 64 slices) requires 1600 storage bits.

Figure 3:
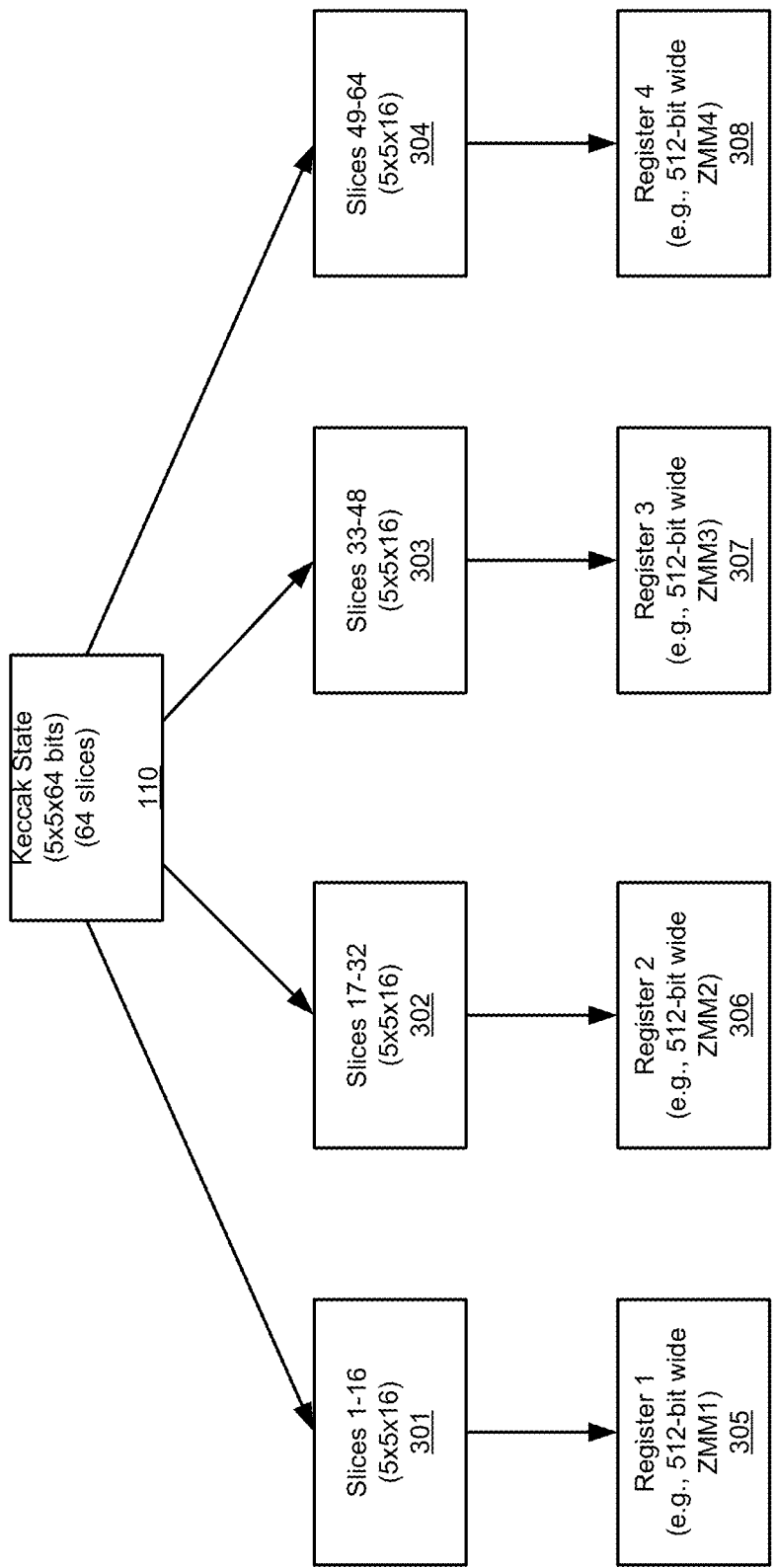
FIG. 3 is a block diagram illustrating partitions of a KECCAK state cube according to one embodiment.

In one embodiment, in response to instruction 106, instruction decoder 101 and/or execution unit 102 may partition KECCAK state cube 110 into four subcubes, where each subcube represents 16 slices or a ¼ state cube, as shown in FIG. 3. Referring to FIG. 3, KECCAK state cube 110 is partitioned into four subcubes 301-304. Four subcubes 301-304 are then stored in at least four registers 305-308, respectively. In one embodiment, registers 305-308 have at least 450 bits, preferably 512-bits such as ZMM compatible registers (e.g., 512-bit wide registers) available from Intel processors. Each of registers 305-308 stores a 5×5×16 or 400 bit portion of the KECCAK state cube (e.g., ¼ state cube). The 400 bits stored in each of registers 305-308 are partitioned as 25 16-bit sections, as shown in FIG. 4.

Figure 4:
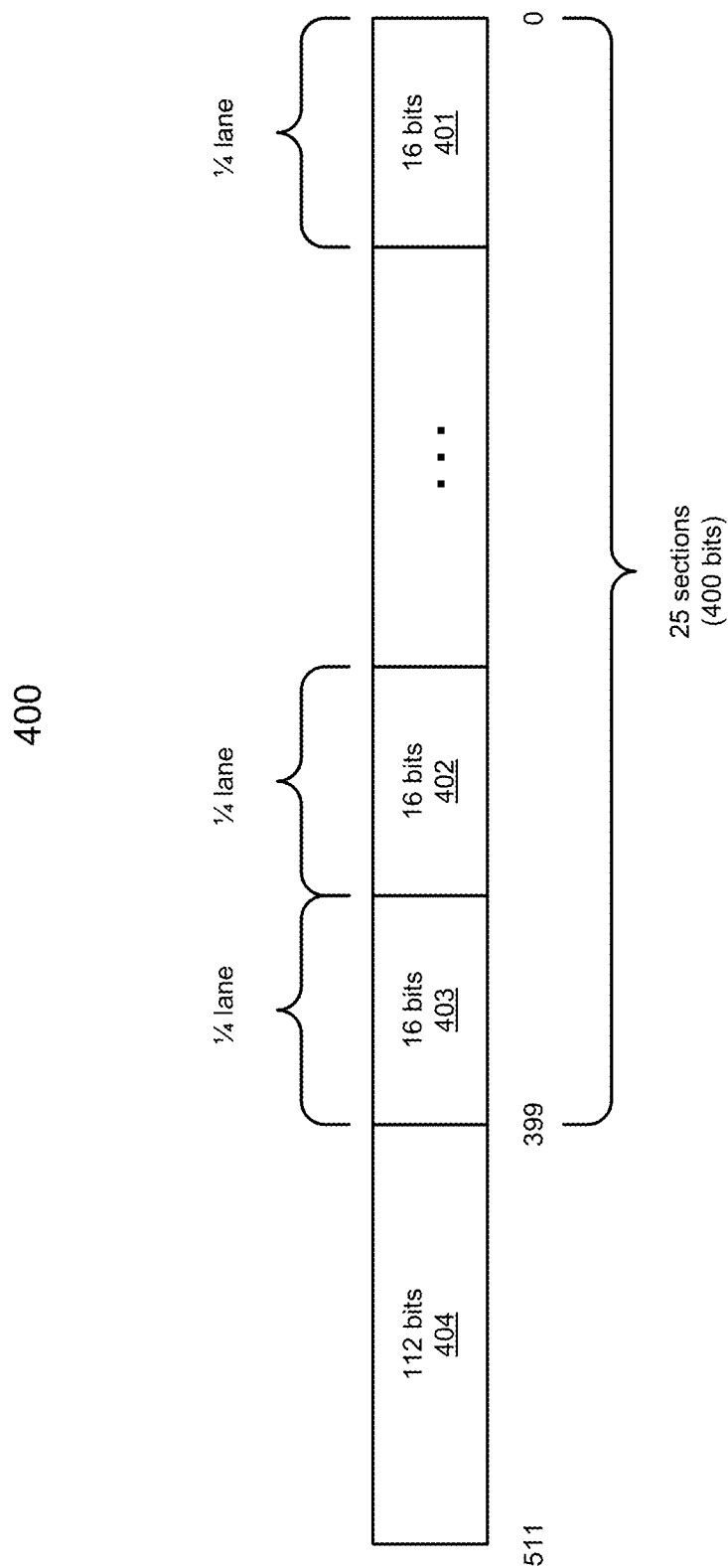
FIG. 4 is a block diagram illustrating a register layout used in KECCAK operations according to one embodiment.

Referring to FIG. 4, register 400 may represent any one of registers 305-308 of FIG. 3. In one embodiment, register 400 is partitioned into 25 16-bit sections 401-403, where each of 16-bit sections 401-403 represents a ¼ lane of the full KECCAK state cube 110. Referring back to FIG. 2, once KECCAK state cube 110 has been partitioned and properly stored in registers 305-308 of FIG. 3, at least some of the KECCAK functions are performed by KECCAK unit(s) 106 of execution unit(s) 102 in a vector manner or parallel.

According to some embodiments, the $\pi$, $\chi$, and $\iota$ functions can be performed for each ¼ cube independent of data from the other ¼ cube sections. To calculate the $\theta$ function of a quadrant (e.g., subcube or ¼ state cube), data from the "next" quadrant will also be needed. Calculating the $\rho$ function for the first 15 slices only need data contained within the quadrant being operated on. However, to operate on the $16^{th}$ slice, the $17^{th}$ slice that is stored in the "next" quadrant is needed. The $\rho$ rotate function requires state from each of the ¼ cubes to perform the lane rotate functions, which are identical for each lane of all the ¼ cubes.

According to one embodiment, at least two instructions or phases are used to process a round of KECCAK operations on each ¼ cube for a total of eight instructions per round. The first instruction or phase is referred to as KECCAK_THETA and can be defined as follows according to one embodiment:

KECCAK_THETA Dst/Src1, Src2, Src3

During the KECCAK_THETA phase, the processor is configured to perform the $\theta$ function and the $1^{st}$ part of the $\rho$ (rotate) function on each ¼ slice:

Src1=The State Quadrant being processed, $z=(z_0$ to $z_0+15)$ mod 64

Src2=The State Quadrant next to Src1, $z=(z_0+16$ to $z_0+31)$ mod 64

Src3=The State Quadrant next to Src2, $z=(z_0+32$ to $z_0+47)$ mod 64

In one embodiment, the first part of the instruction or phase KECCAK_THETA performs the θ function on Src1, Src2 and Src3. Note that the θ of the last slice of Src3 cannot be computed since it needs a slice from the 4th quadrant. The second part of KECCAK_THETA performs a portion of the ρ function. Specifically, for each lane, the processing logic extracts the post 0 bits (e.g., bits 404 of FIG. 4) for bits in the src1 quadrant whose bits will come from the bits in quadrants 1, 2, and 3. The last part of the instruction or phase KECCAK_THETA is to extract the 2 unprocessed slices from Src1 and Src3 (e.g., the first slice of Src1 and the last slice of Src3) and place them in the $17^{th}$ slice of a destination register Dst, Dst[449:400], i.e. Dst[424:400]=Src1[0, 16, 32, . . . . , 384] and the $18^{th}$ slice of Dst, Dst[449:425]=Src3 [15, 31, . . . , 399].

The second instruction or phase is referred to as KEC-CAK_ROUND and can be defined as follows according to one embodiment:

KECCAK_ROUND Dst/Src1, Src2, Src3

During the KECCAK_ROUND phase, processor is to complete ρ rotate function and perform π, χ, ι functions on slices in Src1 quadrant:

Src1=Result of KECCAK_THETA instruction

Src2=Unprocessed Quadrant furthest from the Src1 Quadrant

Src3=KECCAK round constant to be used for ι function

According to one embodiment, the first part of the instruction KECCAK_ROUND is to perform the θ function on the last slice of the "third" quadrant that is stored in Src1[449: 425] and the Src2 quadrant. Note that in order to calculate θ of the last slice of Src2, it needs the unprocessed first slice of Src1 quadrant, which is stored in Src1[424:400]. The second part of KECCAK_ROUND is to extract the bits from the result of the first part that will be needed to complete the ρ function for the quadrant of Src1. This is then followed by performing the π, χ, ι functions on the completed ρ transformed quadrant corresponding to Src1.

FIG. 5 is an example of a pseudocode that performs a round of KECCAK according to one embodiment. Pseudocode 500 may be generated by a compiler and executed by processor 100 of FIG. 2 in a vector manner. Referring to FIG. 5, the state corresponding to the four quadrants is stored in registers ZMM1, ZMM2, ZMM3, and ZMM4, respectively. Here a ZMM compatible register is at least 450-bit wide, preferably at least 512-bit wide. During initialization 501, a copy of subcubes (e.g., a ¼ KECCAK state cube) stored in registers ZMM1-ZMM4 are saved in temporary registers ZMMTMP1-ZMMTMP4, respectively. During phase 502, which is the KECCAK_THETA phase, the θ function and the first part of the ρ function are performed on each of the subcubes stored in registers ZMM1-ZMM4.

During phase 503, which is the KECCAK_ROUND phase, the second part of ρ function, as well as the π, χ, ι functions are performed. Note that register ZMMRC herein contains the round constant used for the ι function. In one embodiment, the second SIMD port of the processor is used to execute the MOV instructions that are used to retain the unprocessed ¼ cube state in order to complete the rotations. In one embodiment, the data path for KECCAK_THETA and KECCAK_ROUND is implemented with a three-cycle data path for a throughput of 10 cycles per round. The 24 rounds of KECCAK complete in 240 cycles or an approximately 4× improvement over the single operation per instruction integer code.

Figure 6:
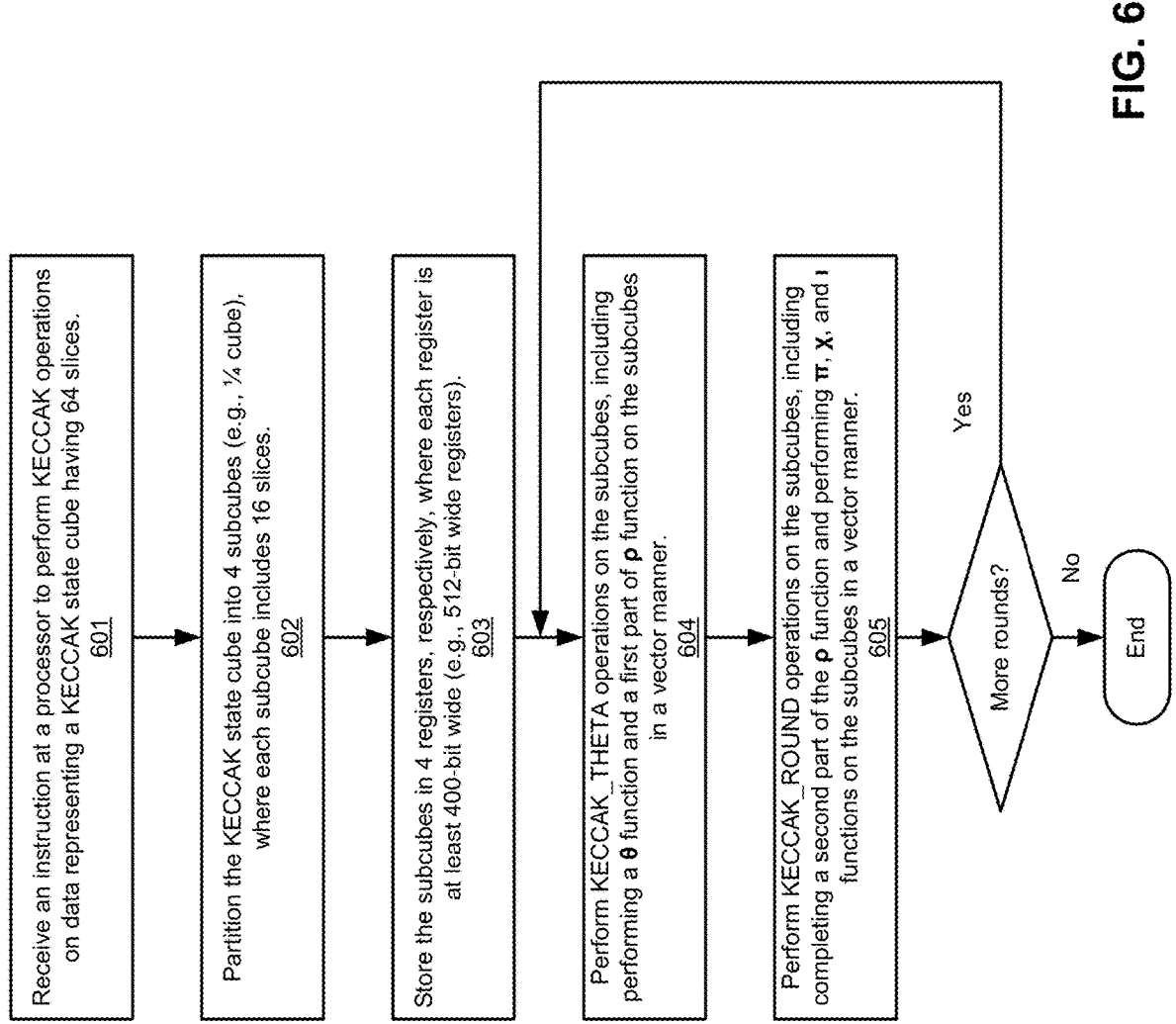
FIG. 6 is a flow diagram illustrating a method to perform KECCAK hash algorithm according to one embodiment.

FIG. 6 is a flow diagram illustrating a method for performing KECCAK operations in a vector manner according to one embodiment. Method 600 may be performed by processor 100 of FIG. 2. Referring to FIG. 6, at block 601, a processor receives an instruction to perform KECCAK operations on data representing a KECCAK state cube having 64 slices. At block 602, the KECCAK state cube is partitioned into four subcubes (e.g., ¼ state cubes), each having 16 slices. At block 603, the subcubes are stored in four registers, respectively, where each register is at least 450-bit wide, preferably 512-bit wide. For each round of the KECCAK operations, at block 604, the KECCAK_THETA phase is performed on the subcubes, including performing a θ function and a first part of a ρ function on the subcubes. At block 605, the KECCAK_ROUND phase is performed, including performing a second part of the ρ function and π, χ, ι functions on the subcubes.

Figure 7:
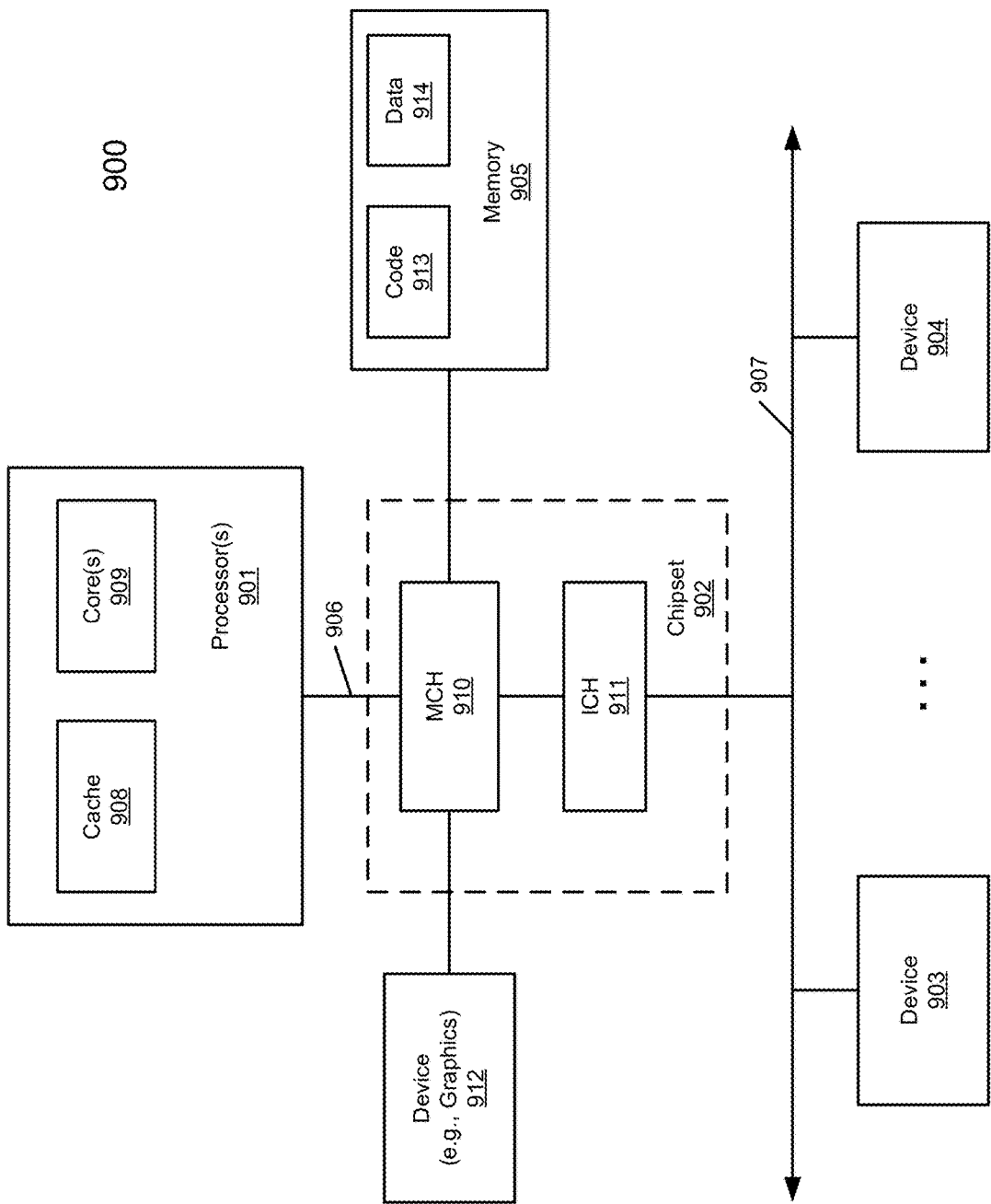
FIG. 7 is a block diagram illustrating an example of a data processing system according to one embodiment.

FIG. 7 is a block diagram illustrating an example of a data processing system according to one embodiment of the invention. System 900 may represent any of the systems described above. For example, processor 901 may represent processor 100 of FIG. 2. System 900 may represent a desktop, a laptop, a tablet, a server, a mobile phone (e.g., Smartphone), a media player, a personal digital assistant (PDA), a personal communicator, a gaming device, a network router or hub, a wireless access point or repeater, a set-top box, or a combination thereof. Note that while FIG. 7 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the present invention.

Referring to FIG. 7, in one embodiment, system 900 includes processor 901 and chipset 902 to couple various components to processor 901 including memory 905 and devices 903-904 via a bus or an interconnect. Processor 901 may represent a single processor or multiple processors with a single processor core or multiple processor cores 909 included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. For example, processor 901 may be a Pentium® 4, Pentium® Dual-Core, Core™ 2 Duo and Quad, Xeon™, Itanium™, XScale™ Core™ i7, Core™ i5, Celeron®, or StrongARM™ microprocessor available from Intel Corporation of Santa Clara, Calif. Processor 901 is configured to execute instructions for performing the operations and steps discussed herein.

Processor 901 may include an instruction decoder, which may receive and decode a variety of instructions. The decoder may generate and output one or more micro-operations, micro-code entry points, microinstructions, other instructions, or other control signals, which reflect, or are derived from, an original input instruction. The decoder may be implemented using various different mechanisms. Examples of suitable mechanisms include, but are not limited to, microcode read only memories (ROMs), look-up tables, hardware implementations, programmable logic arrays (PLAs), and the like.

The decoder may not be a required component of processor 901. In one or more other embodiments, processor 901 may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the bit range isolation instruction, emulate, translate, morph, interpret, or otherwise convert the bit range isolation instruction, and output one or more instructions or control signals corresponding to the original bit range isolation instruction. The instruction conversion logic may be implemented in software, hardware, firmware, or a combination thereof. In some cases, some or all of the instruction conversion logic may be located off-die with the rest of the instruction processing apparatus, such as a separate die or in a system memory. In some cases, the instruction processing apparatus may have both the decoder and the instruction conversion logic.

Processor 901 and/or cores 909 may further include one or more execution units coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact or communicate with each other (e.g., through an intervening component). As one example, the decoder and the execution unit may be coupled with one another through an intervening optional buffer or other component(s) known in the arts to possibly be coupled between a decoder and an execution unit. Processor 901 and/or cores 909 may further include multiple different types of execution units, such as, for example, arithmetic units, arithmetic logic units (ALUs), integer units, etc.

Processor 901 may further include one or more register files including, but are not limited to, integer registers, floating point registers, vector or extended registers, status registers, and an instruction pointer register, etc. The term "registers" is used herein to refer to the on-board processor storage locations that are used as part of macro-instructions to identify operands. In other words, the registers referred to herein are those that are visible from the outside of the processor (from a programmer's perspective). However, the registers should not be limited in meaning to a particular type of circuit. Rather, a register need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file may contain extended multimedia SIMD registers (e.g., XMM) for packed data. Such registers may include 128 bits wide XMM registers and 256 bits wide registers (which may incorporate the XMM registers in their low order bits) relating to SSE2, SSE3, SSE4, GSSE, and beyond (referred to generically as "SSEx") technology to hold such packed data operands.

Processor 901 and/or cores 909 may also optionally include one or more other well-known components. For example, processor 901 may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope is not limited to any known such combination or configuration. Embodiments may be implemented either with or without such additional components.

Chipset 902 may include memory control hub (MCH) 910 and input output control hub (ICH) 911. MCH 910 may include a memory controller (not shown) that communicates with a memory 905. MCH 910 may also include a graphics interface that communicates with graphics device 912. In one embodiment of the invention, the graphics interface may communicate with graphics device 912 via an accelerated graphics port (AGP), a peripheral component interconnect (PCI) express bus, or other types of interconnects. ICH 911 may provide an interface to I/O devices such as devices 903-904. Any of devices 903-904 may be a storage device (e.g., a hard drive, flash memory device), universal serial bus (USB) port(s), a keyboard, a mouse, parallel port(s), serial port(s), a printer, a network interface (wired or wireless), a wireless transceiver (e.g., WiFi, Bluetooth, or cellular transceiver), a media device (e.g., audio/video codec or controller), a bus bridge (e.g., a PCI-PCI bridge), or a combination thereof.

Figure 8:
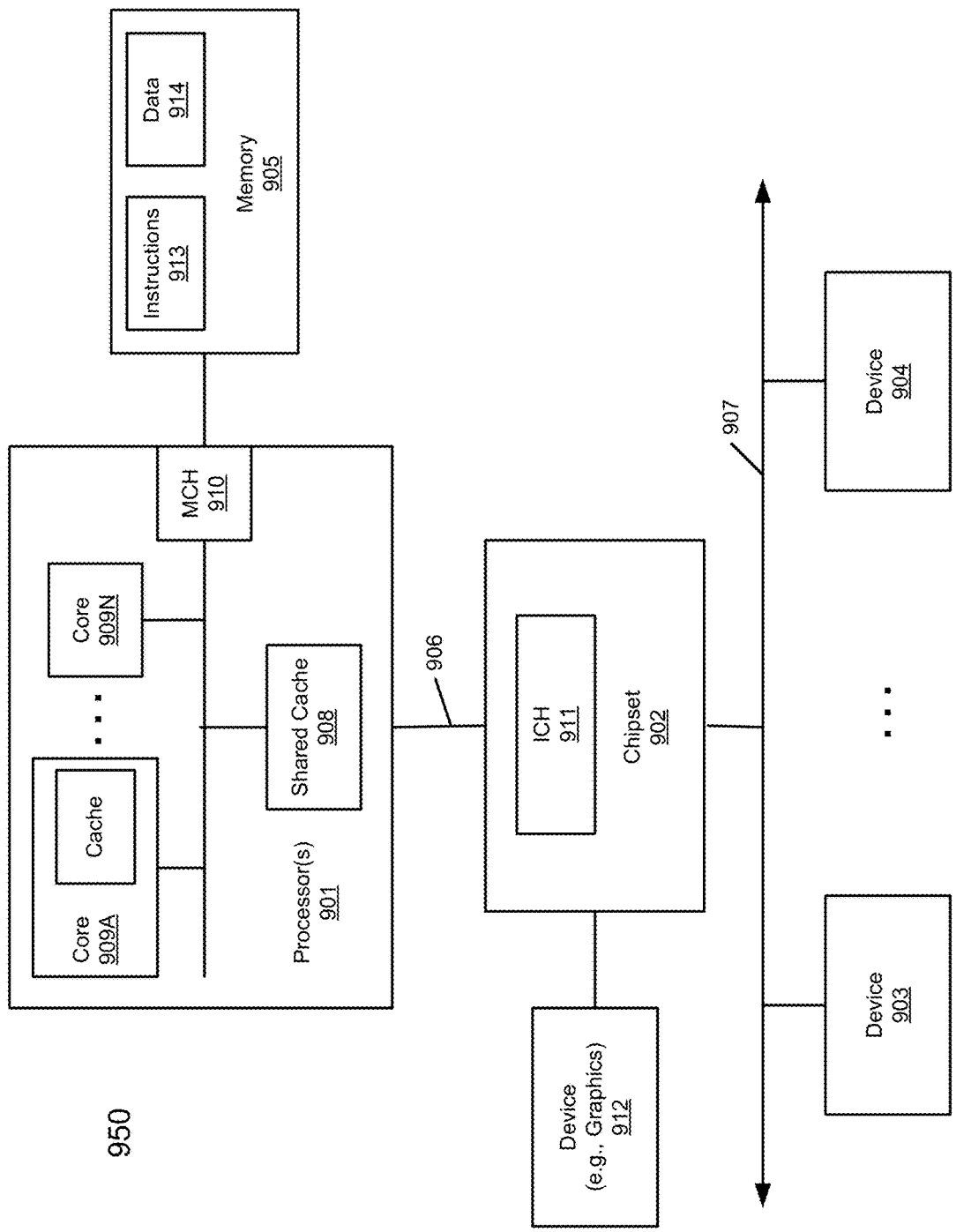
FIG. 8 is a block diagram illustrating an example of a data processing system according to another embodiment.

MCH 910 is sometimes referred to as a Northbridge and ICH 911 is sometimes referred to as a Southbridge, although some people make a technical distinction between them. As used herein, the terms MCH, ICH, Northbridge and Southbridge are intended to be interpreted broadly to cover various chips who functions include passing interrupt signals toward a processor. In some embodiments, MCH 910 may be integrated with processor 901. In such a configuration, chipset 902 operates as an interface chip performing some functions of MCH 910 and ICH 911, as shown in FIG. 8. Furthermore, graphics accelerator 912 may be integrated within MCH 910 or processor 901.

Memory 905 may store data including sequences of instructions that are executed by processor 901, or any other device. For example, executable code 913 and/or data 914 of a variety of operating systems, device drivers, firmware (e.g., input output basic system or BIOS), and/or applications can be loaded in memory 905 and executed by processor 901. An operating system can be any kind of operating systems, such as, for example, Windows® operating system from Microsoft®, Mac OS®/iOS® from Apple, Android® from Google®, Linux®, Unix®, or other real-time operating systems. In one embodiment, memory 905 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a flash storage device. Front side bus (FSB) 906 may be a multi-drop or point-to-point interconnect. The term FSB is intended to cover various types of interconnects to processor 901. Chipset 902 may communicate with other devices such as devices 903-904 via point-to-point interfaces. Bus 906 may be implemented as a variety of buses or interconnects, such as, for example, a quick path interconnect (QPI), a hyper transport interconnect, or a bus compatible with advanced microcontroller bus architecture (AMBA) such as an AMBA high-performance bus (AHB).

Cache 908 may be any kind of processor cache, such as level-1 (L1) cache, L2 cache, L3 cache, L4 cache, last-level cache (LLC), or a combination thereof. Cache 908 may be shared with processor cores 909 of processor 901. Cache 908 may be embedded within processor 901 and/or external to processor 901. Cache 908 may be shared amongst cores 909. Alternatively, at least one of cores 909 further includes its own local cache embedded therein. At least one of cores 909 may utilize both the local cache and the cache shared with another one of cores 909. Processor 901 may further include a direct cache access (DCA) logic to enable other devices such as devices 903-904 to directly access cache 908. Processor 901 and/or chipset 902 may further include an interrupt controller, such as an advanced programmable interrupt controller (APIC), to handle interrupts such as message signaled interrupts.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A processor, comprising:
   a plurality of registers;
   an instruction decoder to decode an instruction, the instruction to indicate to execution circuitry to perform a KECCAK theta phase; and
   execution circuitry coupled to the instruction decoder to execute the decoded instruction to perform the KECCAK theta phase to:
   perform a $\vartheta$ function of a KECCAK algorithm on subcubes stored in the registers in parallel, and
   perform a first portion of a $\rho$ function of the KECCAK algorithm on the subcubes in parallel.

2. The processor of claim 1, wherein each subcube contains 16 slices.

3. The processor of claim 2, wherein the plurality of registers include 4 registers, each having at least 450 bits.

4. The processor of claim 1, wherein each of the plurality of registers contains at least 512 bits, wherein at least 400 bits are utilized to store a subcube, and wherein a remainder of the at least 512 bits is utilized to store intermediate results of the instruction.

5. A method, comprising:
   decoding, in an instruction decoder of a processor, an instruction that indicates to an execution unit to perform a KECCAK theta phase of a KECCAK hash algorithm; and
   executing the decoded instruction, by an execution unit of the processor, by
   performing a $\vartheta$ function of the KECCAK hash algorithm on subcubes stored in registers, and
   performing a first portion of a $\rho$ function of the KECCAK algorithm on the subcubes.

6. The method of claim 5, wherein each subcube contains 16 slices.

7. The method of claim 6, wherein the registers include 4 registers, each having at least 450 bits.

8. The method of claim 5, wherein each of the registers contains at least 512 bits, wherein at least 400 bits are utilized to store a subcube, and wherein a remainder of the at least 512 bits is utilized to store intermediate results of execution of the instruction.

9. A data processing system, comprising:
   an interconnect;
   a processor coupled the interconnect, the processor to decode and execute an instruction to perform a KECCAK theta phase to:
   perform a $\vartheta$ function of the KECCAK algorithm on subcubes stored in registers, and
   perform a first portion of a $\rho$ function of the KECCAK algorithm on the subcubes; and a dynamic random access memory (DRAM) coupled to the interconnect.

10. The system of claim 9, wherein each subcube contains 16 slices.

11. The system of claim 10, wherein the registers include 4 registers, each having at least 450 bits.

12. The processor of claim 1, wherein the instruction is to include identifiers of the plurality of registers.

* * * * *